United States Patent [19]
Barrett et al.

[11] Patent Number: 6,002,514
[45] Date of Patent: Dec. 14, 1999

[54] INTEGRATED LIGHT ABSORBER

[75] Inventors: Colin Paul Barrett, Maidenhead; Stephen Mark Baxter, Penyffordd, both of United Kingdom

[73] Assignee: Bookham Technology Ltd., Abdindon, United Kingdom

[21] Appl. No.: 09/095,817

[22] Filed: Jun. 11, 1998

[30] Foreign Application Priority Data

Jun. 11, 1997 [GB] United Kingdom .................... 9712011

[51] Int. Cl.⁶ .............................. G02B 6/12; G02B 6/125; G02B 6/136
[52] U.S. Cl. .............................. 359/302; 385/14; 385/140
[58] Field of Search ................................ 385/14, 38, 129, 385/130, 131, 132, 140; 257/98; 359/302, 885, 237

[56] References Cited

U.S. PATENT DOCUMENTS

| | | | |
|---|---|---|---|
| 5,018,813 | 5/1991 | Roddy et al. | 385/16 |
| 5,321,779 | 6/1994 | Kissa | 385/14 |
| 5,337,377 | 8/1994 | Yamada et al. | 385/15 |
| 5,463,705 | 10/1995 | Clauberg et al. | 385/14 |
| 5,559,912 | 9/1996 | Agahi et al. | 385/14 |

FOREIGN PATENT DOCUMENTS

| | | |
|---|---|---|
| 0 598 966 | 6/1994 | European Pat. Off. . |
| 60-186807 | 9/1985 | Japan . |
| 8-334649 | 12/1996 | Japan . |
| 9-005548 | 1/1997 | Japan . |
| 9-326502 | 12/1997 | Japan . |

*Primary Examiner*—Georgia Epps
*Assistant Examiner*—Margaret Burke
*Attorney, Agent, or Firm*—Roberts Abokhair & Mardula, LLC

[57] ABSTRACT

The integrated light absorber comprises a light chamber integrated in an optical chip, the chamber having upper and lower walls lying substantially parallel to the chip and peripheral walls extending there between and a light input port in a peripheral wall for receiving light to be absorbed, e.g. from a rib waveguide. At least one of the walls have light absorbing properties and the chamber is shaped so that the majority of light which enters the chamber through the light input port undergoes multiple reflections and so is absorbed by the walls of the chamber. Circular and star-shaped chambers are described.

22 Claims, 2 Drawing Sheets

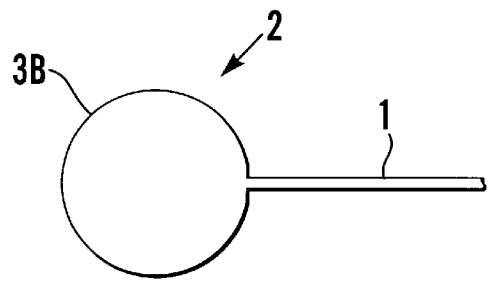
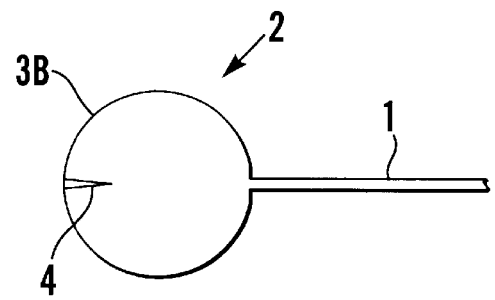
Fig.1          Fig.2
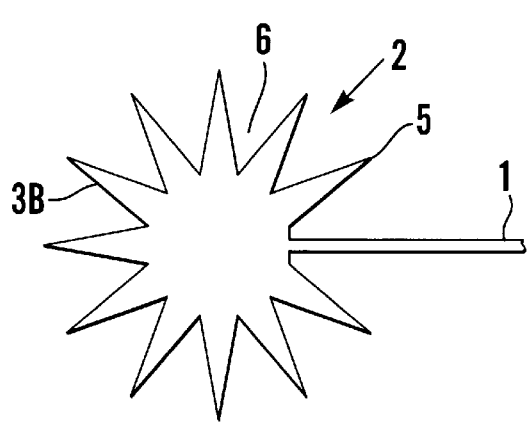
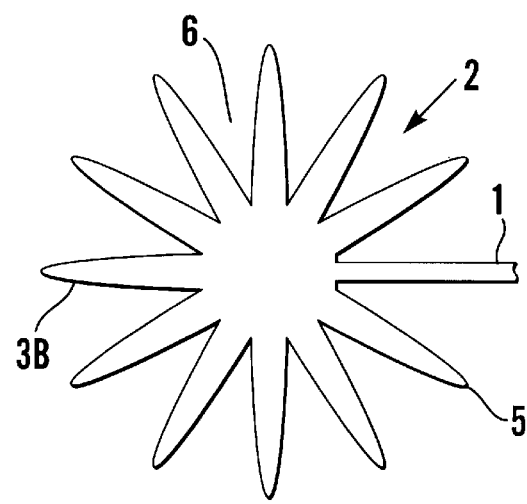
Fig.3          Fig.4

INTEGRATED LIGHT ABSORBER

TECHNICAL FIELD

This invention relates to an integrated light absorber and in particular to a light absorber formed on a silicon chip.

BACKGROUND OF THE INVENTION

Certain features of integrated waveguide circuitry call for the dumping or absorption of light in a controlled manner. Light may need to be confined so it does not escape into the waveguide substrate and is not back reflected into the waveguide from which it came.

Low reflection terminations for waveguides based on anti-reflection (AR) coated angled facets exist and are successful at reducing back reflections into a waveguide. They are not suitable, however, for beam-dumping because light is released into the substrate rather than being absorbed.

SUMMARY OF THE INVENTION

It is therefore an object of the present invention to provide an integrated light absorber formed in a silicon layer and supported on a substrate.

It is a further object of the present invention to provide an integrated light absorber for increasing the number of reflections of light to facilitate increased light absorption in a light absorber formed in a silicon layer and supported on a substrate.

It is a further object of the present invention to provide an integrated light absorber for minimizing the probability of light being coupled back into the waveguide by arranging for the light to undergo multiple reflections in the light absorbing chamber and being attenuated at each reflection.

These and other objects of the invention will become apparent from the following description.

The present invention is directed to an integrated light absorber comprising a light chamber integrated in an optical chip, the chamber being defined by upper and lower walls lying substantially parallel to the chip and peripheral walls extending there between and having a light input port in a peripheral wall for receiving light to be absorbed, at least one of the walls having light absorbing properties, the chamber being arranged such that the majority of light which enters the chamber through the light input port undergoes multiple reflections and so is confined within the chamber and absorbed by the walls of the chamber.

References to "upper" and "lower" used herein are to be understood to be relative to the chip in the orientation shown in FIG. 5 of the drawings and are not restricted to directions relative to gravitational forces.

Preferred and optional features of the invention will be apparent from the following description and from the subsidiary claims of the specification.

The invention will now be further described, merely by way of example, with reference to the accompanying drawings, in which:

BRIEF DESCRIPTION OF DRAWINGS

FIG. 1 is a schematic plan view of a first embodiment of an integrated light absorber according to the invention;

FIG. 2 is a schematic plan view of a second embodiment of an integrated light absorber according to the invention;

FIG. 3 is a schematic plan view of a third embodiment of an integrated light absorber according to the invention;

FIG. 4 is a schematic plan view of a fourth embodiment of an integrated light absorber according to the invention.

DETAILED DESCRIPTION OF THE INVENTION

Figure 5:
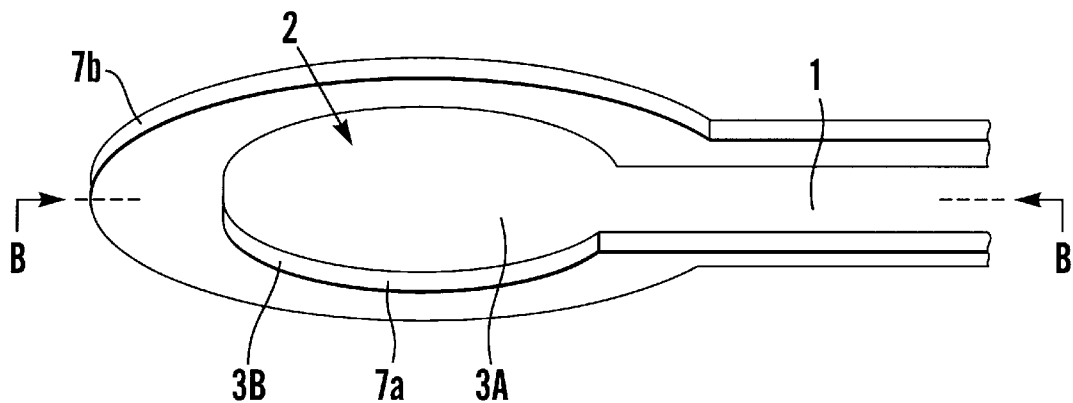
FIG. 5 is a perspective view from above and in front illustrating how an integrated light absorber such as that shown in FIG. 1 may be formed in a substrate.

The figures illustrate integrated light absorbers in which light in an integrated waveguide 1, such as a rib (or ridge) waveguide formed on a silicon-on-insulator chip, is allowed to escape from an end of the waveguide 1, into an enclosed light chamber 2 integrated on the chip. The light chamber 2 is defined by upper and lower walls lying substantially parallel to the plane of the chip (upper wall 3A and lower wall 3C being shown in FIGS. 5 and 6) and peripheral walls 3B which extend there between in a direction substantially perpendicular to the plane of the chip. As will be described below, at least one of the walls defining the chamber 2 preferably has light absorbing properties and the chamber is arranged such that the majority of the light which diverges into the chamber 2 from the waveguide undergoes multiple reflections therein and so is absorbed by the walls of the chamber 2.

The peripheral walls 3B of the chamber are preferably arranged so as to reduce the amount of light which undergoes only a small number of reflections before being reflected back into the waveguide 1.

The upper wall 3A and peripheral walls 3B of the chamber are preferably coated with a light absorbing material. In a silicon-on-insulator chip, the lower wall 3C comprises the interface between an upper silicon layer 7 in which the chamber 2 and waveguide 1 are formed and an underlying insulating layer 8, e.g. of silicon dioxide.

Light enters the chamber 2 through a light input port in the peripheral wall 3B. In the arrangement illustrated, this comprises the connection between the peripheral wall 3B and the rib waveguide 1. However, in other arrangements (not shown) this may comprise a portion of the peripheral wall 3B which permits entry of light from some other source, e.g. an optical fibre.

FIGS. 1–4 illustrate four possible forms of the light chamber 2.

FIG. 1 shows the most basic form of chamber which has a circular shape. This is the simplest shape to fabricate but has the disadvantage that light entering the chamber 2 on the optical axis of the waveguide will be reflected back to the waveguide by a single reflection from the peripheral wall of the chamber directly opposite the light input port. Other paths involving only three or four reflections by which light can be reflected back to the input port also exist. However, most paths require the light to undergo a large number of reflections before returning to the waveguide 1 so the light reflected back to the waveguide 1 is greatly attenuated.

A chamber 2 of multi-sided polygonal shape may be used instead of a circular chamber.

FIG. 2 shows a similar arrangement to FIG. 1 but with an axial spike 4 provided on the peripheral wall of the chamber directly opposite the light input port. The spike 4 scatters light incident thereon on the optical axis of the waveguide and so prevents direct back reflection to the waveguide 1 and hence removes the largest cause of light being reflected back to the waveguide 1.

This principle can be extended by forming a chamber comprising an array of spikes so the chamber has the shape of a multi-pointed star. The spikes point towards a central region of the chamber 2 or towards the light input port. FIG. 3 illustrates such a chamber in which the peripheral walls making up the star shape are substantially straight.

With such a chamber, the only paths having a small number of reflections by which light can be reflected back to the light input port involve reflections from a point either at the bottom 5 or top 6 of a spike.

The star shape may have an arbitrary number of spikes but preferably has at least six points and most preferably at least eleven points (as shown in FIG. 3).

The number of reflections that a typical light ray must undergo before emerging from between two spikes 6, i.e. before emerging from one of the points 5 of the star shape, can be further increased by making the peripheral walls 3B of the points 5 curved, with a substantially parabolic cross-section as shown in FIG. 4.

The arrangements shown in FIGS. 3 and 4 can be further improved by providing smaller spikes between the larger spikes making up the star shape, i.e. at the points 5 of the star shape, to further reduce the reflection therefrom. This process can be continued by forming further miniature spikes between the smaller spikes and so on substantially in the form of a fractal.

The peripheral walls of the chamber 2 may comprise projections or irregularities of other shapes besides the spikes referred to above. The light absorbing chamber may comprise a series of relatively large irregularities between which smaller irregularities are provided and between which yet smaller irregularities are provided, again substantially in the manner of a fractal.

In all the arrangements described, the intention is to minimize the probability of light being coupled back into the waveguide by arranging for the light to undergo multiple reflections in the light absorbing chamber and being attenuated at each reflection.

It should be noted that the more sophisticated the shape of the chamber, the more difficult it will be to fabricate. In the majority of applications, there will, therefore, be a trade-off between the degree of attenuation or absorption required and the simplicity and hence cost of the design.

Figure 6:
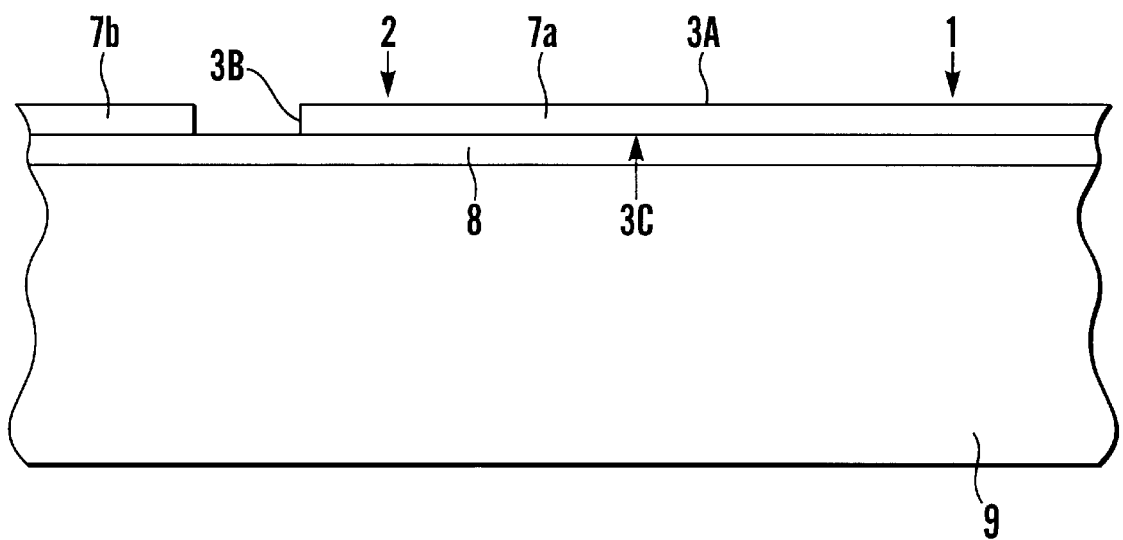
FIG. 6 is a cross-section view on line A—A of FIG. 1 and line B—B of FIG. 5 illustrating how an integrated light absorber such as that shown in FIGS. 1 and 5 may be formed in a substrate.

FIGS. 5 and 6 illustrate how an integrated light absorber such as that shown in FIG. 1 may be fabricated. The Figures show the rib waveguide 1 and a circular light absorbing chamber 2 formed by etching away the surrounding areas of the upper silicon layer 7a to expose the insulating layer 8. The chamber 2 and waveguide 1 are thus homogeneously formed. Having defined the shape of the chamber 2 in this way, any oxide thereon is removed and the chamber is preferably engulfed in light absorbing material, e.g. by depositing the material thereon in direct, intimate contact with the silicon. The upper wall 3A and peripheral walls 3B of the chamber are thus coated with light absorbing material. The lower wall 3C is formed by the interface between the silicon layer 7a in which the chamber 2 and waveguide 1 are formed and the underlying insulating layer 8. The other forms of chamber shown in FIGS. 2–3 may be formed in a similar manner. FIG. 6 additionally shows the relationships among the upper wall 3A, the upper silicon layer 7a, 7b in which the chamber and waveguide are etched, the peripheral wall 3B, the lower wall 3C, the insulating layer 8 and an underlying silicon substrate 9.

The light absorbing material may be a metallic coating, e.g. of aluminum, typically 1–2 microns thick, or some other light absorbing material such as an infra-red absorbing glob top, e.g. formed of an epoxy or polymer material, as used in component encapsulation.

As mentioned above, the light absorber may be formed on a silicon-on-insulator chip which comprises an upper layer of silicon 7a, 7b separated from a substrate 9, e.g. also of silicon, by an insulator layer 8, typically of silicon dioxide. The waveguide 1 and light absorbing chamber 2 are etched in the upper layer of silicon 7a, 7b.

The present invention has been described in detail for the purpose of illustration. It is understood that such detail is solely for that purpose, and variations can be made therein by those skilled in the art without departing from the scope of the invention as disclosed.

We claim:

1. An integrated light absorber comprising a light chamber integrated in an optical chip, the chamber being defined by an upper wall and a lower wall, the upper and lower walls lying substantially parallel to the chip and peripheral walls extending there between; and a light input port in a peripheral wall for receiving light to be absorbed, at least one of the walls having light absorbing properties, the chamber being arranged such that a majority of light which enters the chamber through the light input port undergoes multiple reflections, is confined within the chamber and absorbed by the walls of the chamber.

2. An integrated light absorber as claimed in claim 1 wherein the peripheral walls are arranged so as to reduce the amount of light which undergoes only a small number of reflections before being reflected back to the input port.

3. An integrated light absorber as claimed in claim 2 wherein the chamber has a substantially circular shape.

4. An integrated light absorber as claimed in claim 2 wherein the chamber has a multi-sided polygonal shape.

5. An integrated light absorber as claimed in claim 4 wherein the peripheral walls form a substantially multi-pointed star shape.

6. An integrated light absorber as claimed in claim 5 wherein the peripheral walls are substantially planar.

7. An integrated light absorber as claimed in claim 5 wherein the peripheral walls are curved.

8. An integrated light absorber as claimed in claim 7 wherein the peripheral walls have a substantially parabolic cross-section.

9. An integrated light absorber as claimed in claim 5 wherein the star shape comprises at least six points.

10. An integrated light absorber as claimed in claim 5 further comprising a spike within a point of the multi-pointed star shape, the spike pointing towards a central region of the chamber.

11. An integrated light absorber as claimed in claim 5 comprising a spike within a point of the multi-pointed star shape, the spike pointing towards the light input port.

12. An integrated light absorber as claimed in claim 1 comprising a spike on a portion of the peripheral wall of the chamber which lies substantially opposite the light input port so as to reduce the direct back reflection of a light from the portion of the peripheral wall to the input port.

13. An integrated light absorber as claimed in claim 1 wherein the peripheral wall of the chamber comprises a series of relatively large irregularities, relatively small irregularities between the relatively large irregularities, and relatively smaller irregularities between the relatively small irregularities, substantially in the manner of a fractal.

14. An integrated light absorber as claimed in claim 1 wherein the chamber further comprises a coating of light absorbing material.

15. An integrated light absorber as claimed in claim 14 wherein the light absorbing material is metal.

16. An integrated light absorber as claimed in claim 14 wherein the metal is aluminum.

17. An integrated light absorber as claimed in claim 1 wherein the chamber is disposed within a silicon layer of the optical chip.

18. An integrated light absorber as claimed in claim 17 further comprising a rib waveguide for transmitting light to be absorbed into the light input port of the chamber, the rib waveguide disposed within a silicon layer of the optical chip.

19. An integrated light absorber as claimed in claim 17 wherein the optical chip is a silicon-on-insulator chip.

20. An integrated light absorber as claimed in claim 17 wherein the chamber is coated with a light absorbing material.

21. An integrated light absorber comprising a light chamber integrated in an optical chip, the chamber defined by an upper and a lower wall lying substantially parallel to the chip, peripheral walls extending there between and a light input port in a peripheral wall for receiving light, the chamber further comprising at least one surface for reflecting light received through the light input port, and having at least one of the upper, lower and peripheral walls with light absorbing properties for absorbing light received through the light input port.

22. An integrated light absorber as claimed in claim 21 wherein the chamber further comprises a coating of light absorbing material on at least one of the upper and peripheral walls of the chamber for absorbing light received through the light input port.

* * * * *